Figure 1:
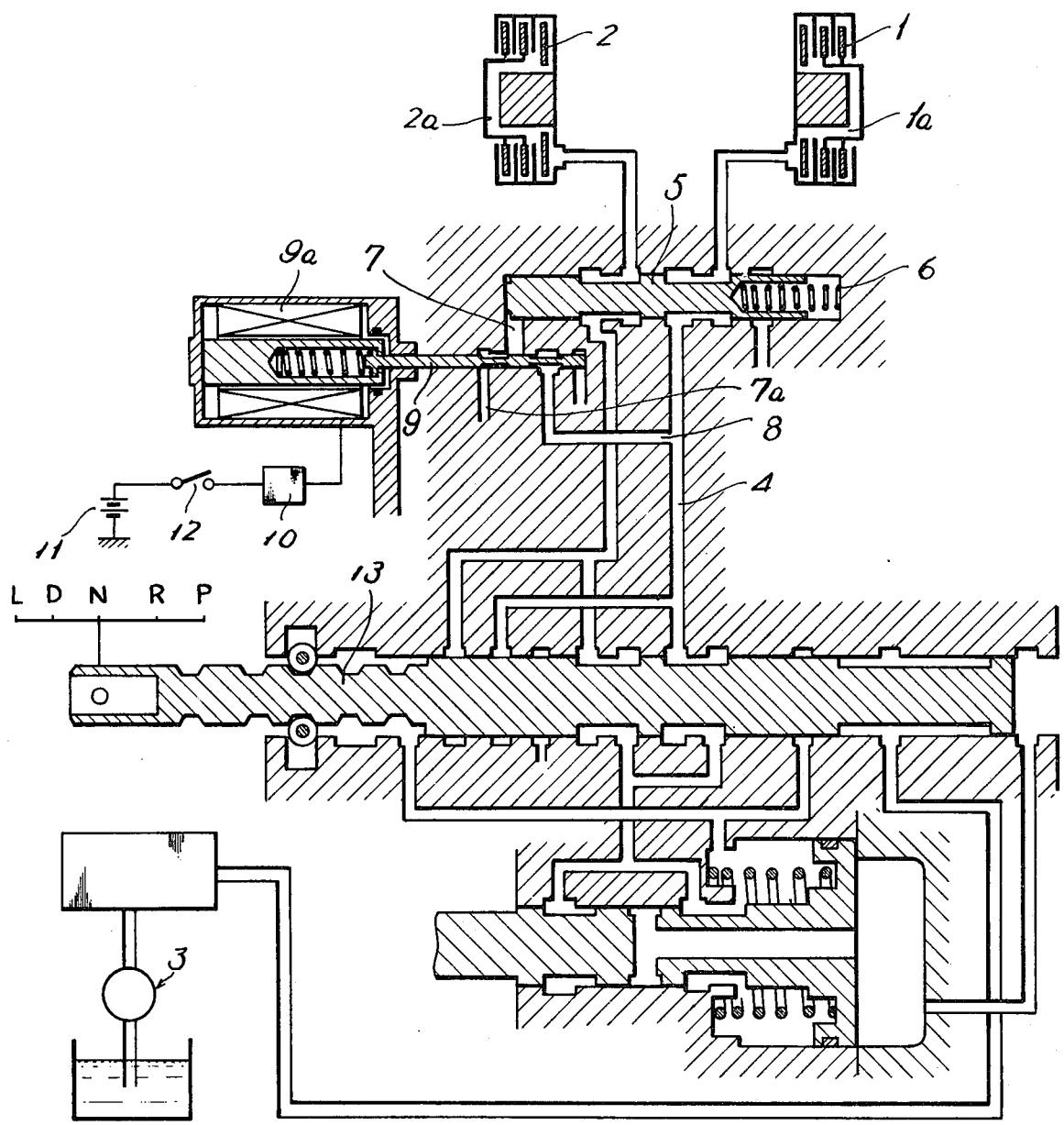

United States Patent [19]

Hattori et al.

[11] 4,057,132
[45] Nov. 8, 1977

[54] SHIFT CONTROL FOR HIGH AND LOW SPEED CLUTCHES OF MOTORCARS

[75] Inventors: Torao Hattori, Wako; Masakazu Maezono, Niiza, both of Japan

[73] Assignee: Honda Giken Kogyo Kabushiki Kaisha, Tokyo, Japan

[21] Appl. No.: 673,891

[22] Filed: Apr. 5, 1976

[30] Foreign Application Priority Data

Apr. 8, 1975 Japan .................................. 50-41776

[51] Int. Cl.$^2$ .................... F16D 25/10; F16D 43/284
[52] U.S. Cl. ............... 192/87.19; 192/87.12; 192/103 F
[58] Field of Search ............... 192/87.18, 87.19, 3.58, 192/103 F, 109 F, 85 A, 84 AA, 87.12

[56] References Cited

U.S. PATENT DOCUMENTS

| 2,929,478 | 3/1960 | Tuck et al. | 192/87.13 X |
| 3,417,845 | 12/1968 | Swanson | 192/87.19 |
| 3,808,738 | 5/1974 | Siebers et al. | 192/3.58 X |
| 3,823,621 | 7/1974 | Kubo et al. | 192/103 F |

Primary Examiner—Benjamin W. Wyche

[57] ABSTRACT

A control apparatus for motorcars having an automatic transmission with a speed-change sensor and a shift valve therein, for controlling the operation of the latter, the apparatus comprising oil-pressure operated high-speed and low-speed clutches interposed in respective high-speed and low-speed systems of the transmission, the system being selectively connectable through the shift valve to a line pressure supply passage connected to an oil-pressure source, wherein the shift valve is operable by the oil pressure and has at one end an oil-pressure chamber connectable to the supply passage through an electromagnetic pilot valve that is responsive to the sensor. Preferably a manually operable valve is interposed between the supply passage and the oil-pressure source, for selectively operating the oil-pressure controlled shift valve in one of a plurality of operational modes of the transmission.

1 Claim, 2 Drawing Figures

SHIFT CONTROL FOR HIGH AND LOW SPEED CLUTCHES OF MOTORCARS

The invention relates to an apparatus for controlling the operation of a shift valve in an automatic transmission, as generally used for motorcars.

One type of apparatus of this kind has been known hitherto in which a shift valve is constructed in the form of an electromagnetic valve that is responsive to a speed-change time sensor, but this known apparatus is defective in that a comparatively large force is required for the operation of the valve. Accordingly the operating solenoid becomes comparatively large in size so that substantial electric power has to be used to energize the same. This results in a battery of the electric power source of the motor vehicle which must have a considerably large capacity.

It is one of the objects of the present invention to provide an apparatus that is free from the foregoing defects.

In accordance with important features of the invention, an arrangement is provided of the type in which an oil-pressure operated high-speed clutch is used in a high-speed system, while a similar low-speed clutch is interposed in a low-speed system, interchangeably connected through a shift valve to a line pressure supply passage leading to an oil pressure source such as a pump and the like.

The invention is mainly characterized in that the shift valve is constructed to be oil-pressure operated rather than being electromagnetic. At one end it has an oil-pressure chamber connected to the above-mentioned supply passage through an electromagnetic valve, in the form of a pilot valve that is responsive to the time sensor.

Figure 2:
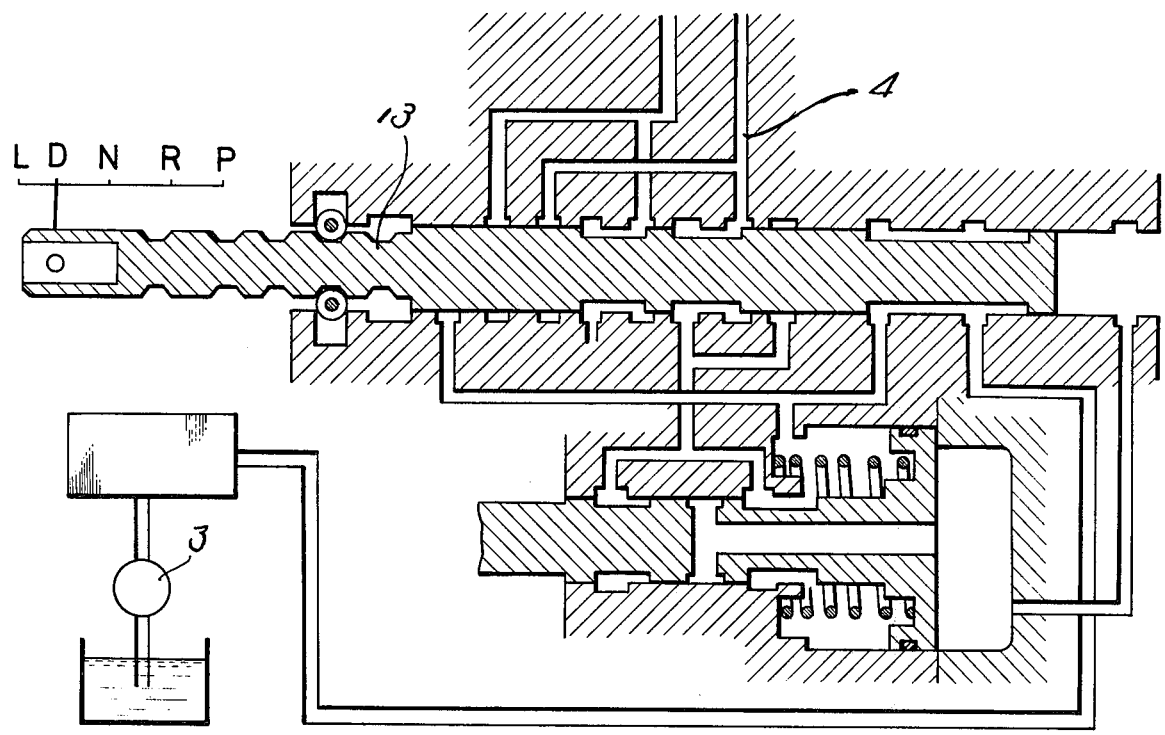

The invention will be better understood by reference to the following description when considered in conjunction with the accompanying drawing, wherein FIG. 1 shows a preferred exemplary embodiment of the inventive control apparatus, an associated manual valve being in the "N" (neutral) position; and FIG. 2 shows the manual valve portion of the arrangement on an enlarged scale, set to its "D" (drive) position.

In the figures, numeral 1 denotes an oil-pressure operated high-speed clutch as conventionally used in a high-speed system while 2 identifies a similar but low-speed clutch incorporated in a corresponding low-speed system. Numerals 1a, 2a identify the respective oil-pressure chambers formed inside the respective clutches, and these chambers are selectively connectable through a shift valve 5 to a line pressure supply passage 4 that is indirectly connected to the delivery side of an oil-pressure source 3, such as an oil-pressure pump, as shown. Further correlations and arrangements, in connection with an interposed manually operable valve, will be explained further down.

The valve 5 is so constructed that it can be switched from a high-speed position to a low-speed position, moving the same toward the respective left-hand and right-hand sides of the drawing. The former is the position where the oil-pressure chamber 1a is connected to the supply passage 4, and in the latter, it is the chamber 2a that is connected to the same passage 4. FIG. 1 shows the valve 5 moved toward the left-hand side, by means of a conventional spring 6, for connection of the high-speed oil pressure chamber 1a. It will be noted that the provision of the spring 6 will ordinarily move the valve 5 toward the left-hand side, as shown, to be in the high-speed position.

In a conventional system, the valve 5 is usually composed or fitted with an electromagnetic valve which can be moved to the right-hand side by the energization of an operating solenoid, and the latter is connectable to an electric source through a speed-change time sensor. This however has the defects as were mentioned earlier.

The present invention is to remove such defects. According to the invention, the valve 5 is provided at its end (on the left-hand side) with an oil-pressure chamber 7, and a pilot valve 9 is attached to the latter, with an ordinarily closed electromagnetic valve, interposed in a flow passage 8 that connects between the oil-pressure chamber 7 and the earlier-mentioned line-pressure supply passage 4.

An operating solenoid 9a about the valve 9 is connectable to an electric source 11 through a sensor 10 responsive to speed-change. Accordingly, when the latter is operated, the valve 9 is opened and its plunger pulled inside, against the biasing force of a spring, so that the oil-pressure chamber 7 is supplied with the pressurized oil from the supply passage 4. This imparts a rightward movement to the shift valve 5; that is, a change-over movement from the ordinarily assumed high-speed to the low-speed position.

The pilot valve 9 is ordinarily closed, and in this position a drain port 7a is opened that is connected to the oil-pressure chamber 7. It should be understood that this port may lead to the outside although it is schematically shown as "ending" within the schematic block containing the various passages.

In the illustrated exemplary embodiment, a high-speed holding switch 12 is also provided which is ordinarily closed, in series with the sensor 10, in the circuit that connects the solenoid 9a with the source 11. If the switch 12 is kept open, or if the sensor interrupts the circuit, no operation of the pilot valve 9 results, and accordingly there is no change-over operation of the shift valve 5. The same automatically remains in the high-speed position.

In can be seen from FIG. 1 that the valve 5 and particularly its passage 4 does not lead directly to the oil-pressure source 3. Numeral 13 denotes a manual valve, forming part of the transmission system, located in the upstream circuit of the valve 5. The valve 13 is so constructed that the same may be changed over manually from an "N" (neutral) position (as shown in FIG. 1) to either of the axially obtainable positions "R" (reverse), "P" (park), "D" (drive) or "L" (low), as customary in most transmission systems, and identified in both figures by the respective capital letters.

Automatic speed-change operation can be obtained, as explained above, when the valve 13 is set to the "D" position as alternatively shown in FIG. 2.

Those skilled in the art will no doubt understand how the oil passages or circuits are selectively interconnected or blocked when the valve 13 is moved from one mode position to the other. To this end, the passage 4 has a branch that leads to the valve 13 at a point spaced apart from the original point of contact, and a similar pair of passages (not numbered) is used for the selective connection of the oil-pressure chamber 2a of the low-speed system.

On the other, lower side of the movable valve portion 13, as shown, two other pairs of passages are shown, for cooperation with respective ones of the passage points 4, in conjunction with cut-outs and shorting passages in the valve itself, as illustrated. The lower right-hand part of the manual valve system need not be identified by numerals because these particulars do not relate to the invention and are customary in transmission systems of this kind.

When the manual valve 13 is kept in its neutral position N as shown in FIG. 1, the line pressure supply passage 4 is not in communication with the delivery side of the oil-pressure source 3 and thus oil pressure is not supplied thereto. Accordingly, the two clutches 1, 2 are both inoperative.

However, if the manual valve 13 is moved to its drive position D as shown in FIG. 2, the passage 4 is connected with the delivery side of the source 3 and is supplied with oil therefrom. Oil under pressure is thus supplied into the passage 4 and is led to the high-speed clutch 1 if the valve 5 is moved to the left as shown in FIG. 1, but is led to the low-key speed clutch 2 if the valve 5 is moved to the right.

It will be seen that the shift valve 5 is not electromagnetic but operates by oil pressure. The chamber 7 provided at one end of the valve is supplied with the pressure oil through a separate electromagnetic valve 9, in the form of a pilot valve, being itself controlled by the electrical circuit constituted by the successively connected elements 9a, 10, 12 and 11. As a result, the operation of the control apparatus is smooth, accurate and free from any drawbacks as have been encountered with the prior-art designs.

It should be understood that many modifications, additions and changes can be made in the described preferred, exemplary embodiment without departing from the spirit and scope of the invention.

What we claim is:

1. A control apparatus for motorcars, having an automatic transmission with a speed-change sensor and a shift valve therein, for controlling the operation of the latter, the apparatus comprising an oil-pressure operated high-speed clutch interposed in a high-speed system, and an oil-pressure operated low-speed clutch interposed in a low-speed system of said transmission, said systems being selectively connectable through said shift valve to a line pressure supply passage connected to an oil-pressure source and having a manually operable valve interposed therebetween, wherein said shift valve is operable by the oil pressure in one of a plurality of operational modes of said transmission, and has at one end an oil-pressure chamber connectable to said supply passage through an electromagnetic pilot valve responsive to said sensor.

* * * * *